United States Patent

Boudouris et al.

[15] 3,639,046
[45] Feb. 1, 1972

[54] PICKOFF DEVICE

[72] Inventors: Angelo Boudouris, Sylvania; Harold M. Plumadore, Toledo, both of Ohio

[73] Assignee: Eprad Incorporated, Toledo, Ohio

[22] Filed: Nov. 3, 1969

[21] Appl. No.: 873,394

[52] U.S. Cl. ...................................................352/92
[51] Int. Cl. ...................................................G03b 21/50
[58] Field of Search ...................................352/92, 124

[56] References Cited

UNITED STATES PATENTS

| 2,039,661 | 5/1936 | Ritenour | 352/92 X |
| 2,437,252 | 3/1948 | Gould | 352/124 |
| 2,473,468 | 6/1949 | Cooley | 352/92 X |

FOREIGN PATENTS OR APPLICATIONS

| 157,122 | 6/1954 | Australia | 352/92 |
| 272,618 | 6/1927 | Great Britain | 352/92 |
| 711,481 | 7/1954 | Great Britain | 352/92 |

*Primary Examiner*—Louis R. Prince
*Assistant Examiner*—Joseph W. Roskos
*Attorney*—Owen & Owen

[57] ABSTRACT

A pickoff device for a motion picture projector can be substituted directly for a backup roller associated with a sprocket of the projector. The pickoff device can be installed without modification in almost any commercially available projector produced in the United States. When a conducting tab or strip on the motion picture film completes a circuit between the pickoff device and the sprocket, an impulse is provided for external controls which can change over the film to a second projector, lower or raise the lights, background music, or curtain, etc.

11 Claims, 5 Drawing Figures

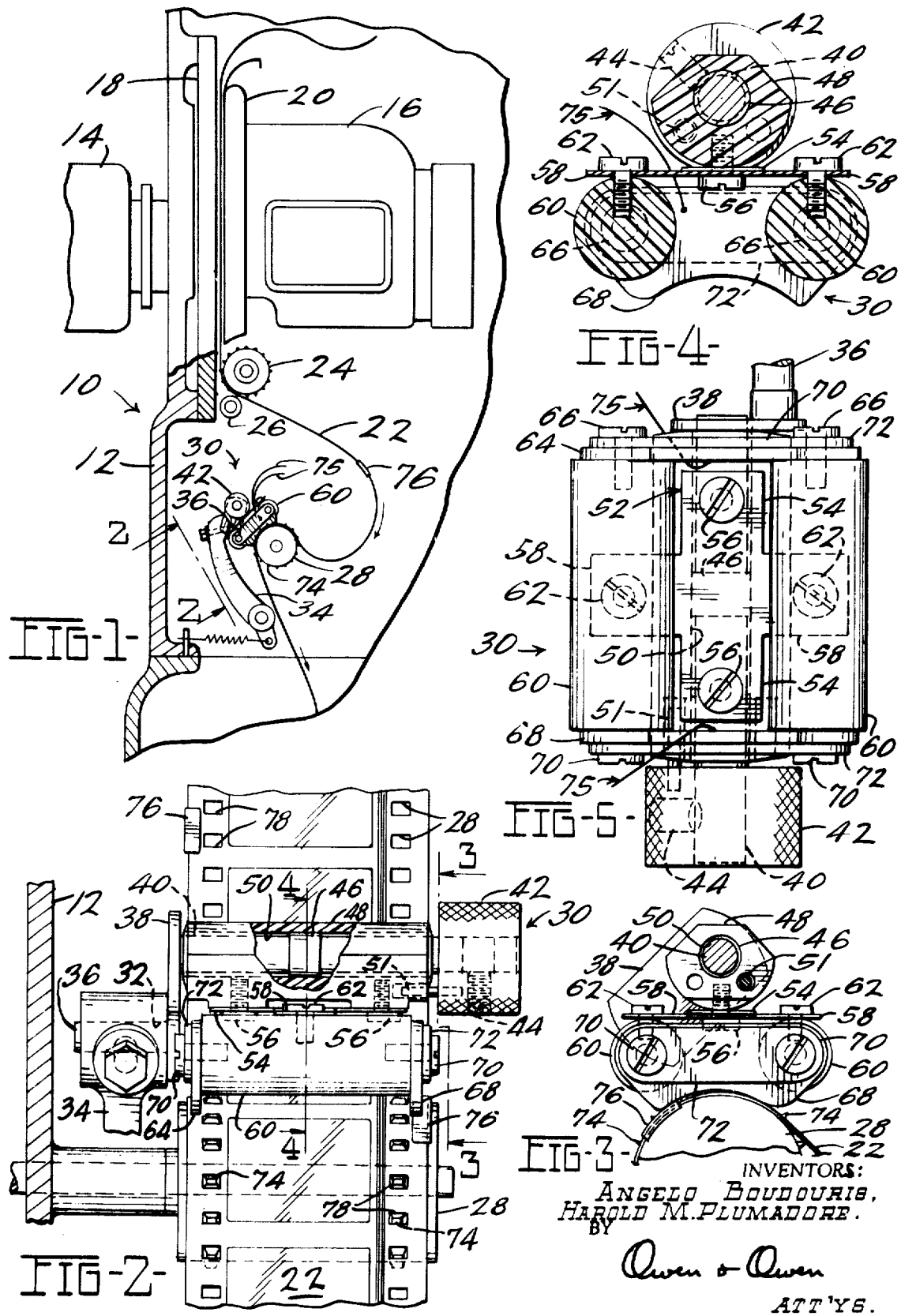

3,639,046

1

PICKOFF DEVICE

BACKGROUND OF THE INVENTION

This invention relates to a pickoff device for a motion picture projector.

There has been a trend in recent years toward automated projection booths for motion picture theaters. By employing larger reels of film, each lasting about an hour, it is possible for a complete show to be projected with one reel changeover. The changeover can be accomplished automatically by a signal produced at an end portion of the film on one reel which is effective to start the second projector and turn off the first at the appropriate time. More elaborate controls have been recently introduced for performing other functions in response to signals effected by the film. Thus, the house lights can be automatically lowered at the beginning of a show and raised at the end. The curtain can be oppositely operated, if desired. Further, background music can be started and the volume increased or decreased at appropriate times during the film.

Heretofore, the pickoff devices mounted on the motion picture film projector to produce an electrical signal in response to an initiating tab or strip carried by the film have been quite elaborate and costly. Further, installation of such devices on existing projectors has also required substantial modification thereof, involving considerable time and expense.

SUMMARY OF THE INVENTION

The present invention provides a pickoff device which is comparatively simple and, further, can be installed on any American-made motion picture projector without requiring any special modification thereof. The new pickoff device is designed to be installed in place of a backup roller employed with a sprocket of a projector, simply being inserted in the same opening in which the backup roller was mounted. The device includes adjustable features which enable it to be accommodated in the existing backup roller mounting opening without requiring alterations, and has a resiliently mounted pair of shoes which also maintain the film in engagement with the teeth of the associated sprocket. The pair of shoes engage the film on the outer edges thereof outside the sprocket holes and also contact the sprocket when there is no film therebetween. The shoes are electrically insulated and each provided with an electrical conductor by means of which an electrical path can be completed through the sprocket, which is grounded, to an external controller. The path is completed when a conducting tab on the film edge moves between a shoe and the sprocket or when the shoe contacts the sprocket. Three types of pulses are possible, two through the individual shoes, and one through both shoes.

It is, therefore, a principal object of the invention to provide an improved pickoff device for a motion picture film projector having the advantages discussed above.

Other objects and advantages of the invention will be apparent from the following detailed description of a preferred embodiment thereof, reference being made to the accompanying drawings.

BRIEF DESCRIPTION OF THE DRAWINGS

FIG. 1 is a fragmentary view in elevation, with parts broken away and with parts in cross section, of a motion picture projector incorporating a pickoff device in accordance with the invention;

FIG. 2 is an enlarged, fragmentary view taken along the line 2—2 of FIG. 1, with parts broken away and with parts in section;

FIG. 3 is a fragmentary view in cross section taken along the line 3—3 of FIG. 2;

FIG. 4 is a view in transverse cross section taken along the line 4—4 of FIG. 2; and FIG. 5 is a bottom view of the pickoff device.

DESCRIPTION OF THE PREFERRED EMBODIMENT

Referring to FIG. 1, a commercial, 35 mm. motion picture film projector is indicated at 10. It includes a housing 12, lens units 14 and 16, and film plates 18 and 20 between which a motion picture film 22 is fed. Below the plates 18 and 20 are a first driven sprocket 24 and a conventional backup roller 26, between which the film 22 is directed. Below these are a second driven sprocket 28 and a pickoff device 30 embodying the invention, again between which the film 22 is directed and below which it is wound upon a takeup reel (not shown.)

The pickoff device 30 is mounted in an opening 32 of the projector, the opening being located in a supporting arm 34, in this instance. The opening 32 is the same one in which a backup roller, similar to the backup roller 26, would ordinarily be mounted, and the pickoff device 30 is substituted for that backup roller without any modifications being required whatsoever. The pickoff device 30 includes a stub shaft 36 received in the opening 32 and terminating in an offset member or plate 38. The upper end of the plate 38 receives a supporting shaft 40 which extends beyond the opposite edge of the film 22 and the sprocket 28 to a knurled handle 42 suitably mounted thereon, as by a set screw 44. The shaft 40 has an enlarged central portion 46 with a generally tubular plastic member 48 being located on the shaft 40 between the offset plate 38 and the handle 42. The tubular member 48 has a central bore 50 which is larger than the shaft 40 so that the member can rock thereon to some extent, about the enlarged portion 46. This facilitates adjustment and proper accommodation of the film by the pickoff device 30, particularly where conducting signal tabs or strips and splices are encountered. The handle 42 is connected to the member 48 through a pin 51 so that they can rotate together to a limited extent to facilitate mounting of the device in the hole 32.

A cross-shaped, resilient mounting plate 52 has a pair of legs 54 mounted on the bottom portion of the tubular member 48 by screws 56 which are threaded into the tubular member 48 but terminate short of the bore 50. Another pair of legs 58 extend transversely to the legs 54 and to the longitudinal extent of the tubular member 48 and the shaft 40. Two plastic supporting members or rolls 60 have central longitudinal portions affixed to the legs 58 by suitable fasteners or screws 62. With this arrangement, the rolls 60 are yieldably or resiliently carried through the cross plate 52 by tubular member 48 mounted on the shaft 40.

At the inner ends of the rolls 60, a contact shoe 64 is mounted by screws 66. Similarly, at the outer ends of the rolls 60, a second contact shoe 68 is mounted by means of screws 70. Insulative covers 72 extend partly over the face of the shoes 64 and 68, as shown in FIG. 3, to minimize the possibility of accidentally establishing an electrical signal through the shoes. The shoes 64 and 68 have arcuate lower edges 72 with a radius substantially the same as the radius of the sprocket 28 and are designed to engage outer edges of the sprocket 28 beyond sprocket teeth 74 when there is no film therebetween. The leading edges of the shoes have large radii to accommodate splices and tabs of the film.

The sprocket 28 can be grounded through the projector housing 12 and a conductor 75 can be electrically connected to each of the shoes 64 and 68. Wherever it is desired to supply a pulse to the external controller at a point on the film, an electrically conducting tab or strip 76 in the form of foil, for example, can be affixed to the film, extending around both sides of the film at an edge thereof beyond sprocket openings 78. When the tab 76 passes between either one of the shoes 64 and 68 and the sprocket 28, a circuit is completed therebetween and between the conductor 75 and ground. With the conductor 75 suitably connected to the external controller, a pulse is provided which will produce a predetermined function. When the film is exhausted and the end passes the sprocket 28, both of the shoes 64 and 68 will contact the sprocket 28 and still another pulse or signal is supplied to the external controller through both circuits. These three types of pulses provide a base for a number of functions to be achieved by the external controller. Further, the tabs 76 can be applied to the film 22 at any desired point to enable a wide variety of functions to be achieved and to enable the projection booth to be fully automated, thereby maintaining manpower at the theater at a minimum.

Various modifications of the above described embodiment of the invention will be apparent to those skilled in the art and it is to be understood that such modifications can be made without departing from the scope of the invention, the embodiment shown and described being primarily for purposes of illustration and not limitation.

What we claim is:

1. In a motion picture film projector including apparatus having an opening for normally receiving a backup roller and having means for biasing such roller against an adjacent sprocket, a pickoff device for detecting electrically conductive portions on the films, said device comprising, in combination, supporting means including a pair of offset shafts, one of said shafts being adapted to be received by the opening in the apparatus which normally receives a backup roller, a pair of electrically conducting shoes, mounting means for attaching said shoes to the other of said shafts, said shoes being spaced apart a distance slightly less than the width of the motion picture film and mounted for contacting edge portions of the film as it passes over the sprocket, said mounting means electrically insulating said shoes from one another and from the projector, and conductor means electrically connected with each of said shoes for establishing a signal to an external control when an electrical path is completed between either of said shoes and the sprocket.

2. A pickoff device according to claim 1 wherein said mounting means includes means rockably mounted on said other shafts, whereby said shoes are free to rock in a direction transversely of the film path.

3. A pickoff device according to claim 1, wherein said other shaft has an increased diameter portion positioned over the center of the sprocket, and wherein said mounting means includes a tubular member having an opening for rockably engaging said increased diameter portion of said other shaft, a pair of electrically insulated shafts having a length identical to the desired spacing between said shoes, means for resiliently attaching said pair of shafts parallel to said tubular member, and means attaching said shoes to opposite ends of said pair of insulated shafts.

4. In combination, a motion picture film projector having a sprocket for engaging motion picture film and an opening for normally holding a backup roller adjacent the sprocket to assure engagement of the film with the sprocket, a pickoff device having a stub shaft carried in said opening, an offset member affixed to said stub shaft, a second shaft parallel to said stub shaft and affixed to said offset member, said second shaft being of a sufficient length to extend beyond the opposite edge of the film, a pair of supporting members resiliently supported relative to said second shaft and being generally parallel to said second shaft, a pair of end shoes mounted on said supporting members and having arcuate edges engageable with the sprocket when there is no film therebetween, and conductor means for aiding in establishing electric circuits through said shoes and said sprocket.

5. The combination according to claim 4 characterized by a tubular member loosely mounted on said second shaft with said pair of supporting members being resiliently supported by said tubular member.

6. The combination according to claim 5 wherein said second shaft has an enlarged central portion and a bore through the tubular member has a diameter exceeding that of the second shaft to enable the tubular member to rock somewhat relative to said second shaft.

7. The combination according to claim 6 characterized further by a handle mounted on said second shaft and connected with said tubular member for rotating said member a limited amount relative to said second shaft.

8. The combination according to claim 5 characterized by said supporting members being resiliently supported by said tubular member through a cross-shaped plate having two legs affixed to said tubular member and two legs centrally affixed to said supporting members.

9. The combination according to claim 4 characterized by an insulating cover affixed to one of said end shoes between the shoe and said offset member.

10. The combination according to claim 4 characterized by the leading ends of said shoes being curved away from the sprocket to facilitate entry of film between said shoes and the sprocket.

11. The combination according to claim 4 characterized by the outer surfaces of both of said shoes having insulative covers thereon.

* * * * *